(No Model.)
S. E. ODELL.
VEHICLE BRAKE.
No. 508,832. Patented Nov. 14, 1893.
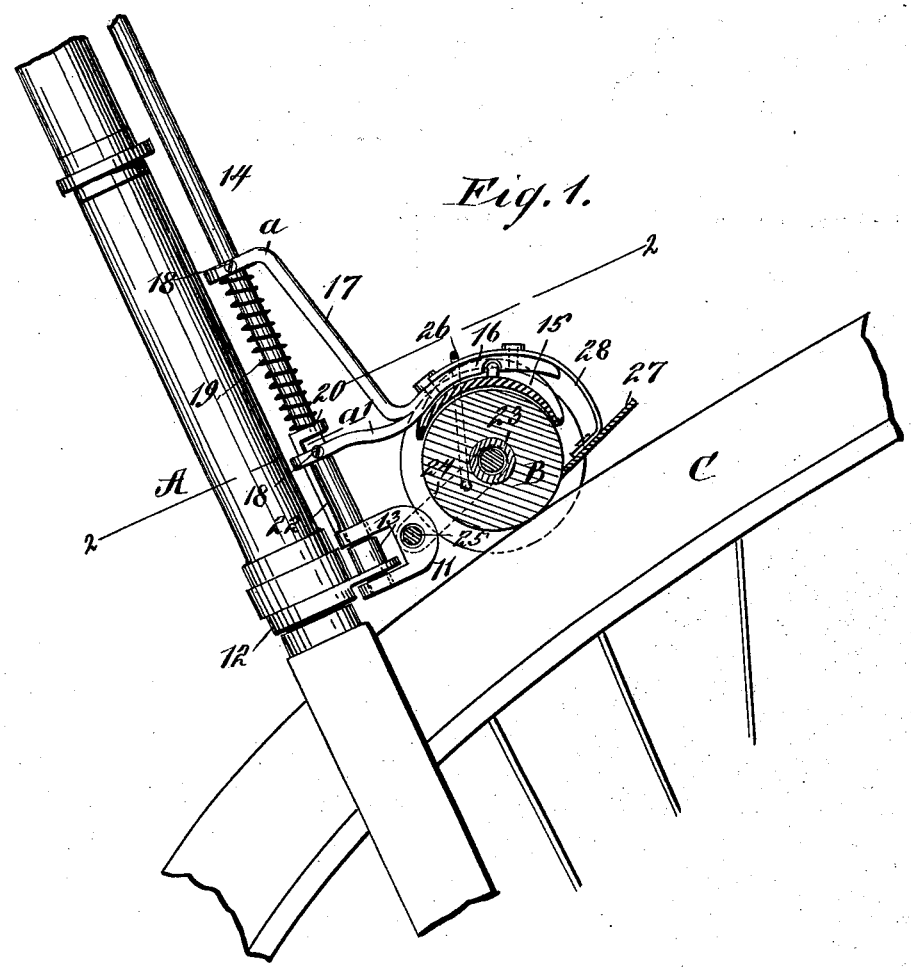
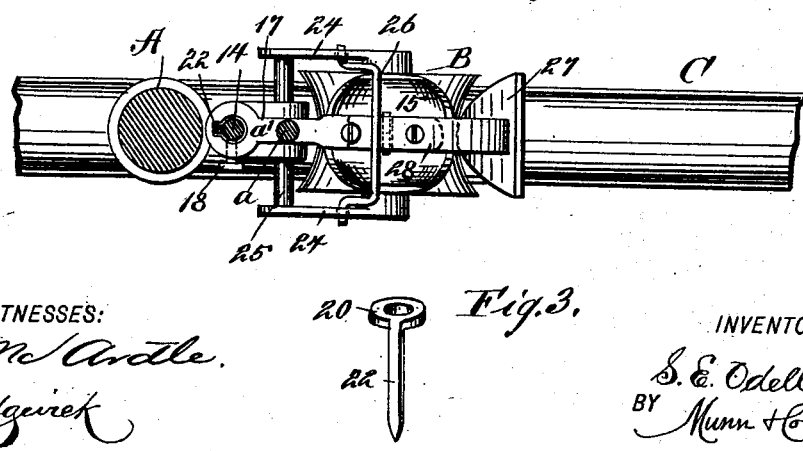
WITNESSES:
INVENTOR
S. E. Odell
BY Munn & Co
ATTORNEYS.

United States Patent Office.

STEPHEN E. ODELL, OF GRAYLING, MICHIGAN.

VEHICLE-BRAKE.

SPECIFICATION forming part of Letters Patent No. 508,832, dated November 14, 1893.

Application filed October 26, 1892. Renewed October 7, 1893. Serial No. 487,483. (No model.)

*To all whom it may concern:*

Be it known that I, STEPHEN E. ODELL, of Grayling, in the county of Crawford and State of Michigan, have invented a new and useful Improvement in Vehicle-Brakes, of which the following is a full, clear, and exact description.

My invention relates to an improvement in brakes, and especially to the construction of a brake to be used upon bicycles and similar vehicles.

It is the object of the invention to provide a brake simple, durable and economic, capable of application to the head of any bicycle, and which when applied will sustain all, or substantially all of the friction, causing essentially no friction between the brake shoe and the tire of the wheel.

A further object of the invention is to provide a brake which will positively cause no sliding friction on the bicycle tire, and consequently will not burn or tear the tire under any condition.

Another object of the invention is to provide a brake, light but powerful, and so constructed that the shoe will fit the surface of the tire and therefore keep the tire in its natural shape even when the strongest pressure capable of being applied is brought to bear upon the brake.

The invention consists in the novel construction and combination of the several parts, as will be hereinafter fully set forth and pointed out in the claims.

Reference is to be had to the accompanying drawings forming a part of this specification, in which similar letters and figures of reference indicate corresponding parts in all the views.

Figure 1 is a side elevation of the brake, illustrating it as applied to the tire of a bicycle wheel, the brake shoe and a portion of the mechanism contiguous to the shoe being shown in section. Fig. 2 is a horizontal section taken practically on the line 2—2 of Fig. 1; and Fig. 3 is a detail view of a collar adapted to be applied to the brake staff.

The prime object of the invention is to interpose between the brake shoe and the tire of the wheel a roller or rolling contact, whereby the friction of the applied brake will be maintained by the interposed rolling bearing, and the bearing will check the wheel with which it contacts without injury thereto in the slightest degree.

In the construction of the brake a clip 11 is attached to a convenient support by means of a collar 12, or the equivalent thereof. When the brake is applied to a bicycle the collar 12, is attached to the head A thereof. The collar is illustrated as extending between arms of the clip 11, and as being provided with a sleeve 13, located also between the arms of the clip; and the surface of the collar below the sleeve is apertured as are likewise the arms of the clip, to receive the brake staff 14. This staff extends downward parallel with the head, as shown in Fig. 1, and the brake shoe 15, is concaved longitudinally and convexed transversely upon its under face. The brake shoe has a rocking connection with the foot 16 of a bracket 17, the body of the bracket comprising an upwardly extending arm $a$ and a horizontal arm $a'$, the two arms being usually united to form the foot 16. Each arm of the bracket terminates in an eye, and the brake staff passes through the eyes of the arms, the bracket being secured rigidly to the brake staff through the medium of set screws 18, or their equivalents, passed through the eyes of the bracket to a firm engagement with the staff. Thus when the staff is raised or lowered the bracket travels with it and likewise the brake shoe 15.

When the brake staff is pressed downward to apply the brake shoe, and after pressure upon the brake staff has been removed, the staff is thrown upward automatically through the medium of a spring 19 coiled around the brake staff, having a bearing at its upper end against the upper arm $a$ of the bracket 17; and the lower end of the spring has fixed bearing against a collar 20, through which the brake staff loosely passes. The collar is located above the lower eye of the bracket, as shown in Fig. 1, and said collar is provided with a downwardly-extending finger 22, said finger passing through an opening provided for it in the lower eye of the bracket to a bearing upon the upper surface of the clip 11. Thus the brake staff is free to be moved up or down, but the collar 20 remains stationary. From this construction it is evident that when the brake staff is pressed downward to apply the brake shoe the bracket is carried with it, and the spring 19, is compressed between the upper eye of the bracket and the fixed collar 20; the moment that downward pressure is removed from the brake staff the spring acts to throw the staff upward to its normal position.

The brake shoe 15, is adapted to fit over the periphery of the roller B, the peripheral surface of said roller being grooved; and this roller is adapted to engage with the tire C of the wheel when the brake is applied. When the brake is applied to a bicycle the roller B is of such width, and its peripheral groove is so shaped that it receives neatly and partially surrounds the rubber tire. The roller B when engaging with the tire of the wheel is adapted to travel with the wheel unless checked by the brake shoe 15. The roller is mounted upon a spindle 23, which spindle is held to turn in arms 24, pivotally connected with opposite sides of the clip 11, the pivotal connection between the clip and the arms being usually effected by passing a pin 25 through both parts, as shown in Fig. 2. The roller B is normally held out of engagement with the tire of the wheel through the medium of a stirrup 26, ordinarily made of spring wire. The stirrup has its ends sprung into openings produced in the arms 24 supporting the roller; and the upper portion of the stirrup extends over both the roller and the foot of the bracket 17.

A scraper 27, is normally held to engage with the periphery of the roller, an edge of this scraper conforming to the contour of the roller periphery; this scraper is supported by a strap 28 attached to it and usually to the shoe and the bracket 17. The scraper is adapted to remove any foreign matter that may cling to the roller or object forced upon it by its engagement with the tire of the driving wheel.

In the application of the brake, when the brake staff is pressed downward, for example, the roller contacts with the periphery of the tire of the driving wheel, turning with the wheel, and almost immediately afterward the brake shoe is brought to a positive frictional engagement with the roller, stopping the revolution thereof, and at the same time through the medium of the roller checking or stopping the revolution of the driving wheel, according to the amount of pressure brought to bear upon the brake shoe.

This brake is exceedingly simple, and it will be observed that as a rolling contact exists between the tire of the wheel and the brake shoe, the interposed wheel will sustain all the friction, especially sliding friction, and the tire of the wheel will not be burned or torn as frequently happens by the application of the ordinary brake, while the machine may be stopped equally quick.

Having thus described my invention, I claim as new and desire to secure by Letters Patent—

1. In a bicycle brake, in combination, the wheel C the head A, the brake staff held for vertical movement on the head, a brake shoe carried by such staff, and the brake roller B, pivotally connected with the head A and held between the wheel C and brake-shoe, substantially as and for the purpose described.

2. In a bicycle brake, the combination with the head A, the vertically movable brake staff, a bracket carried thereby a brake roller mounted in arms pivotally connected to the head A and a brake shoe engaging such roller and having a rocker bearing on the aforesaid bracket, substantially as and for the purpose described.

3. The combination, with a brake staff and a shoe carried thereby, of a roller journaled in arms pivoted upon a fixed support beneath the shoe, and a support holding the roller adjacent to the shoe between the shoe and the article to which the brake is to be applied, substantially as shown and described.

4. In a bicycle brake, the combination with the head A, the brake roller B having a pivotal support on the head, the vertically movable brake staff, said staff carrying a bracket 17 projected over the roller B, a shoe on the projecting end of the bracket 17 engaging said roller, the suspending bail 26 and means for normally holding the bracket to its upper position, all arranged substantially as shown and for the purposes described.

5. In a bicycle brake, the combination with the wheel C, the head A, the roller B supported over the wheel C, and pivotally connected with the head A, of the vertically movable staff, the bracket 17 secured thereto having a portion 16 projected over the roller B, the shoe 15 and the scraper 27, bearing on the roller B, and connected to the end 16 of the bracket 17, all substantially as shown and for the purpose described.

6. The combination of the head A, the apertured clip 11, pivotally connected thereto, the arms 24 pivoted at one end to the clip, the roller B journaled in the outer end of such arms, the vertically movable staff 14 held at its lower end in the clip 11, the bracket 17 on the staff the spring 19 on the staff engaging the bracket at one end, the stop 20 on the staff forming the bearing for the lower end of the spring, the shoe 15 on the bracket engaging the roller B and the bail 26 connecting the arms 24 and the bracket 17 all arranged substantially as and for the purpose described.

STEPHEN E. ODELL.

Witnesses:
 FRED F. THATCHER,
 ROBERT MCELROY.